(No Model.)
J. P. DE MOSS, Jr.
HARROW.
No. 573,505. Patented Dec. 22, 1896.
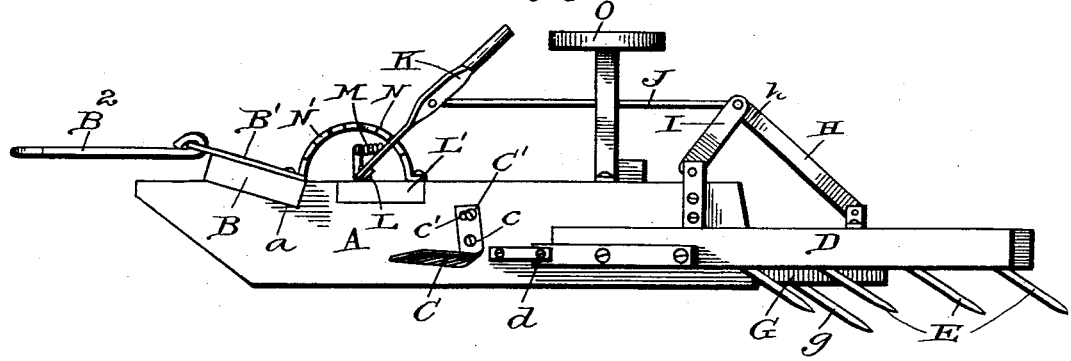
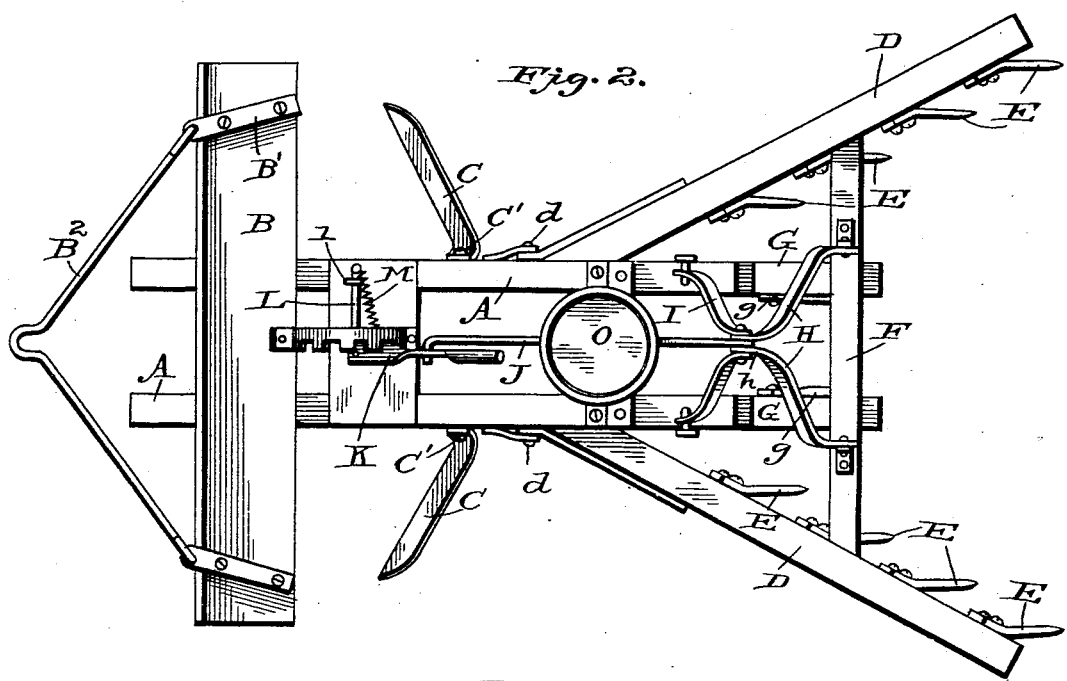
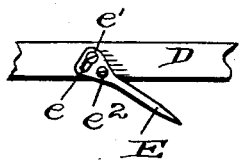
Witnesses
Edwin G. McKee
K. C. Nau.
Inventor
John P. DeMoss Jr.,
By John Wedderburn
his Attorney.

UNITED STATES PATENT OFFICE.

JOHN P. DE MOSS, JR., OF GRAND PASS, MISSOURI.

HARROW.

SPECIFICATION forming part of Letters Patent No. 573,505, dated December 22, 1896.

Application filed April 2, 1896. Serial No. 585,911. (No model.)

*To all whom it may concern:*

Be it known that I, JOHN P. DE MOSS, Jr., a citizen of the United States, residing at Grand Pass, in the county of Saline and State of Missouri, have invented certain new and useful Improvements in Harrows; and I do hereby declare the following to be a full, clear, and exact description of the invention, such as will enable others skilled in the art to which it appertains to make and use the same.

This invention relates to certain new and useful improvements in combined harrows and gophers for cultivating listed corn; and it has for its object, among others, to provide a simple and cheap device of this character composed of few parts, and those readily assembled, not liable to get out of order, and by which more satisfactory results are obtained with less attention on the part of the operator.

My improved implement cultivates from the corn upward and loosens the ground around the corn. There can be no trash or clods left around the corn. The ground is left smooth and perfectly pulverized.

The apparatus can be adjusted to suit any size corn and be arranged so as to put just enough dirt around the roots of the corn. The teeth behind the runners break the same and crush and pulverize it thoroughly. These teeth are adapted to be elevated when turning around, so as not to touch the ground. The weight of the rider is adjusted so as to be thrown on the runners by raising the harrow-beams in front, as occasion may require. The knives are inclined slightly forward and upward, so that weeds cannot possibly slide around them, as they are liable to do when the knives are sloped backward.

Other objects and advantages of the invention will hereinafter appear, and the novel features thereof will be particularly pointed out in the appended claims.

The invention is clearly illustrated in the accompanying drawings, which, with the letters of reference marked thereon, form a part of this specification, and in which—

Figure 1 is an elevation of my improved harrow. Fig. 2 is a top plan. Fig. 3 is a detail showing the manner of adjustment of one of the teeth.

Like letters of reference indicate like parts in the several views.

Referring now to the details of the drawings by letter, A designates the slide-runners, of proper length, connected at their forward ends by the draft-beam B, which is secured thereto in an inclined position, being seated in inclined slots $a$ in the upper faces of said runners, as shown. To the upper faces of this draft-beam are connected the metallic bars or strips B', inclined toward each other at their forward ends, and to the forward ends of said bars are secured the ends of the draft attachment $B^2$, which may be of any well-known or approved form of construction. Upon opposite sides of the runners are the knives C, having vertical portions pivotally mounted thereon, as at $c$, and their upper ends provided with the elongated slots $c'$, in which engage the screws C', so that the inclination of the knives may be adjusted when desired. These knives are inclined upward and slightly forwardly, as shown, so as to be sure to cut the weeds and prevent any of them from slipping over the knives.

D are the harrow-beams, pivotally mounted at their forward ends by suitable hinges or pivots $d$ to the outer faces of the slide-runners, and these beams incline outwardly as they extend rearwardly, and upon their inner faces are secured the harrow-teeth E, of any suitable form of construction, their shanks having the elongated slots $e$, into which extend the screws or analogous means $e'$, by which they may be adjusted on their pivots $e^2$.

F is a cross-beam secured to the beams D, and on this cross-beam are the horizontal short beams G, which are arranged in line with the harrow-teeth $g$, similar in all respects to the harrow-teeth on the beams D and rendered adjustable in the same manner. Secured to the upper face of the cross-beam F is the yoke H, the forward end of which is provided with the extensions $h$, which are pivotally held to the yoke I, which is pivotally supported at its lower end in any suitable manner upon the upper rear ends of the slide-runners.

J is a rod pivotally connected with the pivot-pin or connection between said yokes and its forward end connected with the lever K, which is pivotally mounted upon the transverse shaft L, adapted to rock in the staples or analogous bearings *l* on the cross-beam L', arranged near the forward ends of the runners. One end of this cross-rod is formed with a crank-arm, to which is connected a spring M, the other end of which is connected with the lever and arranged to normally hold the latter in engagement with the notches N' of the notched quadrant N, which is secured at one end to the cross bar or beam L' and at the other end to the draft-timber B.

O is the seat, arranged upon a suitable support rising from the slide-runners near the rear end.

The operation will be readily understood. When going to or from the field, the lever is pressed inward, so as to elevate the harrow-beams, so that the teeth thereof will not be in contact with the ground. When in operation, the lever is moved rearward, so as to drop the beams with the teeth in contact with the ground, and the depth of cut can be regulated by manipulation of the lever. When the driver is of unusual weight, the runners can be tilted so as to elevate their rear ends by throwing the lever farther rearward, and thus the weight is distributed.

Modifications in details may be resorted to without departing from the spirit of the invention or sacrificing any of its advantages.

Having thus described the invention, what is claimed as new is—

1. The combination with the slide-runners and the pivoted harrow-beams, of the lever, connections between the same and the beams, and the short longitudinal beams carrying harrow-teeth in line with the runners, substantially as described.

2. The combination with the slide-runners and the pivoted harrow-beams, of the lever, connections between the same and the beams, and the short longitudinal beams carrying harrow-teeth in line with the runners, and the knives upon opposite sides of the runners, substantially as described.

3. The combination with the slide-runners and the pivoted harrow-beams, of the lever, connections between the same and the beams, and the short longitudinal beams carrying harrow-teeth in line with the runners, and the knives upon opposite sides of the runners, and the seat mounted on the runners near the rear end thereof, substantially as described.

4. The combination with the slide-runners and the harrow-beams pivotally mounted thereon, of the cross-beam connecting the harrow-beams, the longitudinal beams in line with the runners, the pivoted lever, connections between the same and the cross-beams, substantially as described.

5. The combination with the slide-runners and the harrow-beams pivotally mounted thereon, of the cross-beam connecting the harrow-beams, the longitudinal beams in line with the runners, the pivoted lever, connections between the same and the cross-beams, and the crank-shaft on which the lever is pivoted and the spring connecting the crank thereof with said lever, substantially as described.

6. The combination with the slide-runners and the harrow-beams pivotally mounted thereon, of the cross-beam connecting the harrow-beams, the longitudinal beams in line with the runners, the pivoted lever, connections between the same and the cross-beams, and the crank-shaft on which the lever is pivoted and the spring connecting the crank thereof with said lever, and the notched quadrant with which said lever is adapted to engage, substantially as described.

In testimony whereof I have signed this specification in the presence of two subscribing witnesses.

JOHN P. DE MOSS, JR.

Witnesses:
HENRY VANDERLINDEN,
DANIEL G. SIMMONS.